United States Patent [19]

Nakashima et al.

[11] Patent Number: 4,713,443

[45] Date of Patent: Dec. 15, 1987

[54] PROCESS FOR REMOVING ORGANIC COMPOUND HAVING HIGH BOILING POINT FROM A FLOATABLE POLYMER

[75] Inventors: Toshimitsu Nakashima, Takasago; Wataru Okada, Kobe; Toragoro Mitani, Takasago, all of Japan

[73] Assignee: Kanegafuchi Kagaku Kogyo Kabushiki Kaisha, Osaka, Japan

[21] Appl. No.: 809,107

[22] Filed: Dec. 16, 1985

[30] Foreign Application Priority Data

Dec. 17, 1984 [JP] Japan .................................. 59-265842
Jul. 4, 1985 [JP] Japan .................................. 60-148040

[51] Int. Cl.$^4$ .............................................. C08F 6/24
[52] U.S. Cl. .................................. 528/499; 528/502; 528/503
[58] Field of Search ................ 523/319; 528/483, 502, 528/503, 499

[56] References Cited

U.S. PATENT DOCUMENTS

| | | | |
|---|---|---|---|
| 3,122,528 | 2/1964 | Hanesworth, Jr. | 528/502 X |
| 3,954,910 | 5/1976 | Kropp et al. | 260/879 |
| 4,092,471 | 5/1978 | Arai et al. | 528/502 |
| 4,209,436 | 6/1980 | Creemers et al. | 260/29.7 |

FOREIGN PATENT DOCUMENTS 0006288 1/1980 European Pat. Off. ............ 528/502

Primary Examiner—Joseph L. Schofer
Assistant Examiner—F. M. Teskin
Attorney, Agent, or Firm—Armstrong, Nikaido, Marmelstein & Kubovcik

[57] ABSTRACT

A process for removing an organic compound having a high boiling point from a floatable polymer containing the organic compound, which comprises contacting a slurry of the polymer with a non-condensable gas at a high temperature by strongly agitating with an agitator at an impeller Reynolds number of not less than $10^5$. According to the process, the organic compound having a high boiling point can be readily removed down to not more than 10 ppm.

12 Claims, 2 Drawing Figures

PROCESS FOR REMOVING ORGANIC COMPOUND HAVING HIGH BOILING POINT FROM A FLOATABLE POLYMER

BACKGROUND OF THE INVENTION

The present invention relates to a process for removing an organic compound having a high boiling point such as an unreacted monomer from a floatable polymer in a state of an aqueous slurry.

Generally, polymer latices prepared by emulsion polymerization are coagulated by being in contact with acids or salts, heated and subjected to dehydration and drying, and then collected in a form of powder. According to this process, it is impossible to avoid the disadvantage that the collected product contains various impurities such as additives in the emulsion polymerization, decomposites produced in the cause of the polymerization and remaining unreacted monomers In many cases these impurities not only affect various processabilities of the polymer, but also generate color and smell, and reduce stability of the polymer. Further they lower the operation stability and value of the product. In addition, when using the polymer as wrapping or package materials for foods, the impurities cause problems in smell and even in health.

As processes for removing not only remaining unreacted monomers of a low boiling point but remaining organic compounds of a high boiling point such as unreacted monomers having a boiling point of not less than 100° C., there are employed a treatment of latex in reduced pressure, a gas-liquid contact treatment of latex, a treatment of slurry by steam stripping or by drying, and the like. However, though in polymerization system of vinyl chloride which has a low boiling point, the remaining monomers can be removed from the slurry of the resulting suspension polymerization by various methods, it seems impossible to remove remaining monomers from polymerization system of monomers having a boiling point of not less than 100° C., as explained hereinbelow.

Namely removal from the latices is not advantageous because foaming of the slurry and scale deposition occur. The steam stripping treatment of the slurry is not economical because of requirement of a large amount of steam, and affects quality of the product because of long contact with steam. Also the drying treatment tends to result in fires and degrades quality of the product due to oxidation.

In case of an MBS resin which is a graft copolymer prepared by polymerizaing 10 to 90 parts (part by weight, hereinafter the same) of one or more monomers selected from a vinyl aromatic compound, a methacrylate, an acrylate and a vinyl cyanide compound in the presence of 10 to 90 parts of a butadiene polymer consisting of 0 to 50% (% by weight, hereinafter the same) of styrene and 50 to 100% of butadiene (the talal amount of the monomers and the butadiene polymer being 100 parts), it is impossible to avoid that the unreacted monomers remain at a high concentration of 1000 ppm (in the resin), because for ensuring its processability and quality the polymerization reaction, is controlled so as not to be completed to the end. When using such an MBS resin as wrapping or package materials for foods, removal of the remaining organic compounds such as the unreacted monomers is essential, because it is strongly desired that the remaining styrene monomer in the MBS resin is removed so that a concentration of the monomer is not more than 10 ppm when using for food wrapping materials.

According to the conventional processes, however, the removal of the organic compounds having a high boiling point to such a desired concentration level is substantially impossible. For instance, when the removal of the remaining monomers is carried out in a continuous process by using an admixing tank, there is often observed a phenomenon that a concentration of the unreacted monomers in a drain slurry increases because the unreacted monomers short-pass at a high concentration.

An object of the present invention is to provide a process for sufficiently removing organic compounds having a high boiling point from an aqueous slurry of a floatable polymer containing the organic compounds.

This and other objects of the present invention will become apparent from the description hereinafter.

SUMMARY OF THE INVENTION

According to the present invention there is provided a process for removing an organic compound having a boiling point of not less than 100° C. from a floatable polymer containing the organic compound, which comprises contacting a slurry of the polymer with a non-condensable gas at a high temperature by strongly agitating with an agitator at an impeller Reynolds number of not less than $10^5$.

According to the process of the invention, the organic compound having a high boiling point can be readily removed from the floatable polymer without affecting the quality of the polymer.

The words "a floatable polymer" as used herein means a polymer which can float on a surface of an aqueous slurry of the polymer when the slurry is allowed to stand.

The organic compound to be removed according to the invention is, as mentioned above, an organic compound having a boiling point of not less than 100° C. (hereinafter referred to as "high bp organic compound"). Examples of the high bp organic compound are, for instance, remaining unreacted monomers, additives in the polymerization system, resulting decomposites, by-products, and the like.

DETAILED DESCRIPTION OF THE INVENTION

Figure 1:
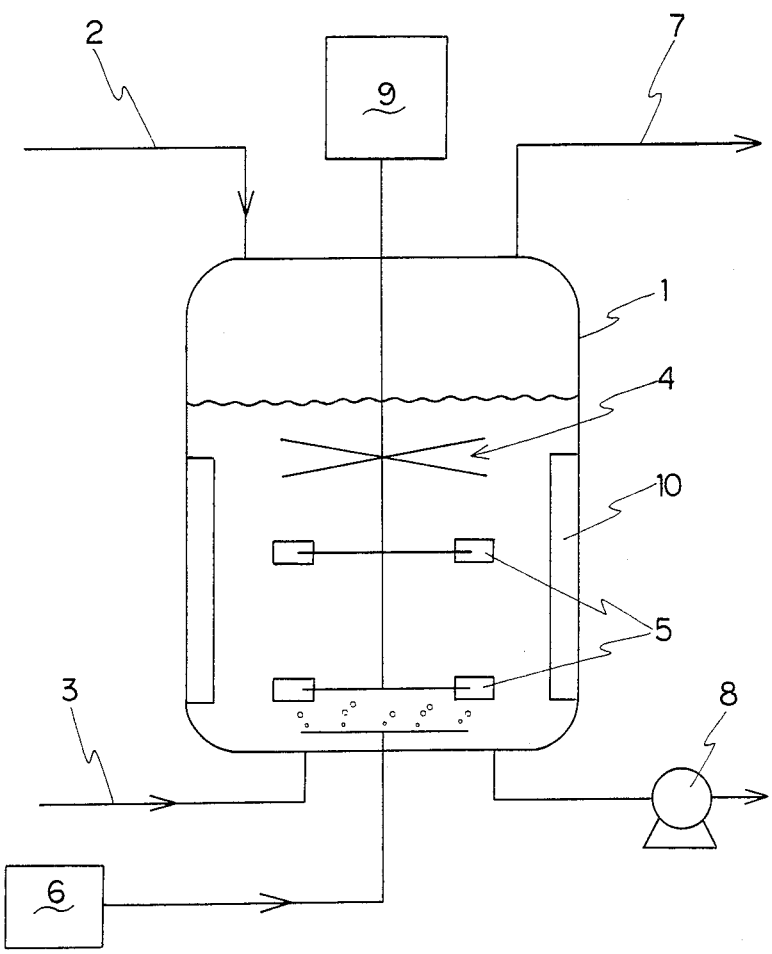
FIG. 1 is a diagramatic view of an embodiment of the present invention.

In the present invention, the polymer from which the high bp organic compound is removed is floatable. By utilizing the floatable property of the polymer, the polymer can be readily and sufficiently dispersed by strong agitation which is the essential operation to remove the high bp organic compound such as an unreacted monomer. Examples of the floatable polymer are, for instance, ABS resins, MBS resins, AS resins, and the like. The floatable polymer treated in the present invention is not limited to the above examples, and the process of the invention is applicable to polymers which are floatable and form a slurry and contain the high bp organic compound to be removed from the polymerization system.

In the present invention, a slurry of the floatable polymer is used. The reasons why the use of the slurry are that the slurry can be agitated and that a high concentration of the polymer can be obtained, which is preferable in economical view.

The concentration of the polymer in the slurry gives complicated influences to monomer transfer resistance between the liquid and the gas. Preferable concentration is 8 to 20% from viewpoints of productivity and economy. When the concentration is less than 8% the productivity tends to become low, and when more than 20% the removing efficiency tends to reduce due to increase of the monomer transfer resistance.

The polymer slurry can be present in three states, i.e. a state of latex, a state of coagulated slurry obtained by contacting the latex with an acid or base, and a state of thermally treated slurry obtained by thermally treating the coagulated slurry to cure. The selection of the states is decided by considering as to which state can reduce the degradation of quality more and as to in which state the high bp organic compound such as a remaining monomer can be removed more effectively.

For example, when a slurry is in the state of latex, there are defects that the bubbling of the carrier gas, i.e. the non-condensable gas causes foaming of the slurry and scale formation, and also that in case of MBS resins it takes a long time to reduce the styrene monomer concentration to not more than 10 ppm, which results in degradation of quality.

When the slurry is in the state of coagulated slurry, though there is a possibility that the coagulated particles are broken during the strong aditation or during the transferring operation due to poor mechanical strength of the polymer, there is an advantage that a thermal treating apparatus can be eliminated because the thermal treatment can be achieved in the course of the process of the invention.

This disadvantage in the coagulated slurry, i.e. poor mechanical strength can be solved when the slurry in the state of thermally treated slurry is used. Therefore the bad influence to quality of the polymer can be almost avoided.

Accordingly, as a state of the polymer slurry, it is preferably to employ the state of coagulated slurry or the state of thermally treated slurry.

In case of treating the polymer slurries in the state of coagulated slurry or in the state of thermally treated slurry according to the process of the present invention, when only the bubbling procedure of the carrier gas is done the removing efficiency of the remaining monomer is very low, because the polymer particles are floated and the carrier gas cannot sufficiently contact with the polymer particles. In addition the floatability of the polymer is disadvantageous to the steam stripping procedure because the floatability drastically increases with the elevation of temperature. Therefore, according to the present invention, the polymer particles in the slurry must be uniformly dispersed by strongly agitating the slurry with an appropriate agitator at an impeller Reynolds number of not less than $10^5$.

In general as an apparatus for contacting the slurry with the carrier gas, there is a liquid-gas contact apparatus such as an agitating tank or a bubbling tower.

Since a simple bubbling tower without an agitator is affected by the floatability of the polymer particles, the polymer particles cannot be uniformly dispersed. As a result, in case of continuous charge and discharge of the slurry, the rate of removal of the high bp organic compound becomes low because a slurry having a high concentration of the high bp organic compound is drained and a polymer concentration is locally increased. For solving the problems of the floatability, an excess amount of the carrier gas must be bubbled, which is economically disadvantageous.

These problems in the simple bubbling tower can be solved by strongly agitating with an agitator. The strong agitation for solving the problem as to the floatability is also advantageous to sufficient dispersion of the carrier gas which is important in the present invention, and further can reduce an amount of the carrier gas to be bubbled. Thus, the strong agitation is not disadvantageous in economy.

Considering the above factors, the contact operation of the floatable polymer and the carrier gas must be carried out by strong agitation in an agitating tank with an agitator.

In the present invention, the carrier gas to be contacted with the polymer is a non-condensable gas such as nitrogen gas, carbonic acid gas, helium gas, argon gas, neon gas, air or an admixture thereof, which is gaseous around normal temperature. In view of influence to the polymer and safety in explosion and fire, a gas inert to the polymer such as nitrogen gas, carbonic acid gas, helium gas, argon gas or neon gas is preferably employed. In view of economy, it is preferable to employ air. When the high bp organic compound such as a remaining monomer is removed from the floatable polymer slurry such as MBS resin slurry, the transfer rate of the high bp organic compound from the slurry to the carrier gas is governed by the transfer resistance of the high bp organic compound from the slurry to the carrier gas. In the system of the present invention, since the transfer resistance is large, in order to enhance the removing effeciency it is important to agitate sufficiently, whereby the transfer resistance is decreased and the carrier gas is finely dispersed in the slurry to increase the contact surface area between the gas and the slurry.

The strong agitation in the process of the present invention is carried out at an impeller Reynolds number of not less than $10^5$, preferably $10^5$ to $10^8$ at a high temperature. In the course of the agitation, the slurry is contacted with the carrier gas, in other word the carrier gas being bubbled in the slurry. An agitator and agitating tank used in the invention should satisfy the above requirements.

An agitator used in the present invention preferably has at least one set, preferably 1 to 4 sets of turbine blades and at least one set, preferably 1 to 4 sets of paddle blades provided thereabove. The turbine blades can achieve sufficient mixing of the polymer slurry and sufficient dispersion of the carrier gas, and the paddle blades can achieve prevention of floating of the polymer. For preventing the polymer from floating and from staying on the slurry surface, it is preferable that the paddle blades are provided so that when the carrier gas is not introduced to the slurry the top set of the paddle blades is positioned above the slurry surface and that when the carrier gas is introduced to the slurry the top set of the paddle blades is positioned under the slurry surface. In addition, the upper top edge of the paddle blades is preferably positioned above baffle plates which are provided in the agitating tank for preventing the polymer from floating and from staying around the baffle plates.

The turbine blades are preferably provided near the entrance of the carrier gas to be charged in order to finely disperse the carrier gas. Examples of the turbine are, for instance, a flat turbine, a pitched turbine, a disk turbine, and the like. From an economical viewpoint such as driving power requirment, it is preferable to employ the flat turbine. Depending on the amount of the slurry and the depth of the slurry, there may be provided some sets of turbine blades to form a multi-stage turbine blades system. In this way the bubbles of the carrier gas is prevented from combining and can be dispersed again. A ratio of the turbine blade to the tank in diameter is preferably 0.3 to 0.5 from viewpoints of prevention of floating, sufficient dispersion of the carrier gas and economy.

The agitator having the turbine blades and the paddle blades is installed in the agitating tank. The agitating tank has 3 or 4 baffle plates for improving the dispersion of the polymer. The baffle plate is preferably provided at a lower position than the upper top edge of the paddle blade so that the baffle plates are present under the slurry surface during the treating operation, i.e. bubbling of the carrier gas, in order to avoid the staying of the polymer near the baffle plates. When the baffle plates are exposed over the slurry surface during the treating operation, the polymer stays around the exposed baffle plates, which is disadvantageous.

The higher the treating temperature becomes, the more the removing effect increases. Preferable treating temperature is not more than 90° C., more preferably not more than 85° C. in view of influence to the quality of the polymer. Though the lower limit is not particulary limited, the treating temperature is preferably not less than 60° C., more preferably not less than 75° C. in view of treating time and productivity, since when the temperature is lower than 60° C. the removing rate remarkably decreases. The treating time, i.e. polymer staying time during which the slurry is exposed at that temperature is not more than 2 hours, preferably not more than 60 minutes.

In the present invention the initially charged polymer slurry is preferably heated to the given temperature. In addition for maintaining the treating temperature at that temperature, it is preferable to always supply heat to the slurry because the heat energy is removed by the exhaust carrier gas. The heat may be supplied by means of a jacket. From viewpoints of installation cost and productivity such as temperature elevation time, it is preferable to carry out the heating by introducing steam or by controlling the charging sturry or gas, because the content in the agitating tank is sufficiently agitated.

The process of the present invention can be carried out in a batchwise operation and in a continuous operation.

One embodiment of the batchwise operation according to the present invention is explained with FIG. 1. In FIG. 1, numeral 1 is an agitating tank which is a stripping treatment apparatus. The tank 1 is charged with a polymer slurry such as the thermally treated slurry through a slurry-charging line 2 so that a slurry surface in the tank is positioned under paddle blades 4. The charged slurry is agitated with the paddle blades 4 and turbine blades 5 which are connected to a driving device 9 for the agitator at an impeller Reynolds number of not less than $10^5$. While keeping the agitation, steam is introduced into the slurry through a steam-introducing line 3 so that a temperature of the slurry is elevated to a stripping temperature of 60° C. to 90° C. From a non-condensable gas source 6 such as a compressor, a non-condensable gas, e.g. air is introduced and bubbled into the slurry at 1 to 4 N m$^3$/min (dried gas) per 1 m$^3$ of the slurry to be treated (hereinafter referred to as "VVM"), and then the operation is continued for not more than 2 hours while keeping the inner temperature of the tank 1 at the stripping treatment temperature by introduing the stram.

A high bp organic compound such as an unreacted monomer is exhaused through an exhaust gas line 7 together with the carrier gas. After the stripping treatment, the supply of the steam is stopped and the supply of the carrier gas is throttled, and then the treated slurry is drained out of the tank 1 with a pump 8.

In the batchwise operation, when removing styrene monomer from MBS resin so as to reduce a concentration of styrene monomer from about 1000 ppm to not more than 10 ppm, the following non-restrictive conditions are preferably employed.

Figure 2:
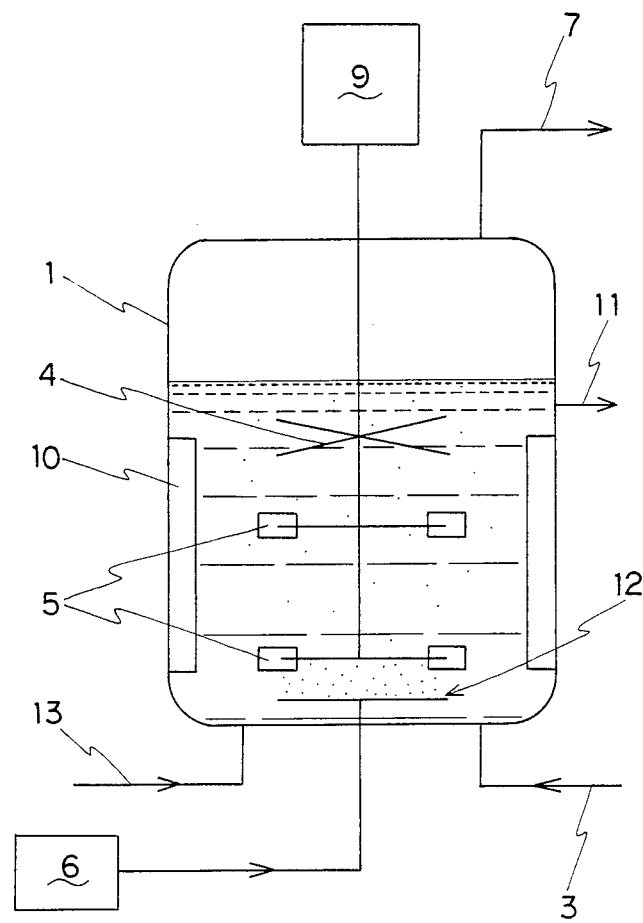
FIG. 2 is a diagramatic view of another embodiment of the present invention.

Treating temperature: 75° to 85° C.
Impeller Reynolds number: Not less than $10^5$, preferably $10^5$ to $10^8$
Polymer concentration in slurry: 8 to 20%
Treating time: Not more than 2 hours
Supply of carrier gas: 1 to 4 VVM The continuous operation can be carried out, for instance, by using the system shown in FIG. 2. In FIG. 2, the same numerals as those in FIG. 1 designate the same elements as those in FIG. 1. The continuous operation is conducted in the followings. The tank 1 is charged with water so that the water surface is positioned near the lower edge of the paddle blades 4. The charged water is agitated gently with the agitator having the paddle blades 4 and the turbine blades 5 which is driven by the device 9. Under the gentle agitation steam is introduced through the steam-introducing line 3 to elevate the temperature of water up to a stripping-treating temperature, e.g. 75° to 85° C. After the temperature elevation, a non-condensable gas is introduced into water from the non-condensable gas source 6, and the rotation rate of the agitator is raised so that an impeller Reynolds number is not less than $10^5$, preferably $10^5$ to $10^8$. The tank 1 is then charged with a polymer slurry such as the thermally treated slurry through a slurry-charging line 13 at a predetermined slurry-charging rate so that the charged slurry stays in the tank for a predetermined average staying time, e.g. 30 minutes. When the slurry surface level is higher than a predetermined level, the excess amount of the slurry overflows and then drained through a slurry-drain line 11 at the same flow rate as the slurry charging rate. The carrier gas (air) together with a high bp organic compound such as an unreacted monomer is exhausted out of the tank through the exhaust gas line 7.

In the continuous operation, when removing styrene monomer from MBS resin so as to reduce a styrene monomer concentration from about 500 ppm to not more than 10 ppm, the following non-restrictive conditions are preferably employed.

Treating temperature: 75° to 85° C.
Impeller Reynolds number: Not less than $10^5$, preferably $10^5$ to $10^8$
Polymer concentration in slurry: 8 to 20%
Mean residence time: Not more than about 60 minutes, preferably 10 to 60 minutes
Supply of carrier gas: 1 to 4 VVM The continuous operation can be carried out by employing one individual tank or by employing some tanks which are connected in series. When carrying out in one individual tank, the procedures can be simplified. On the other hand when employing the series-connected tanks, the removing efficiency can be increased. However, when the number of tanks is increased, installation cost becomes large, which is disadvantageous in economy. Accordingly, there are preferably employed 2 or 3 tanks.

The treating time is decided by a mean residence time. It is not preferred to stay too long in view of quality of products. Therefore, preferable mean residence time is not more than 60 minutes, more preferably 10 to 60 minutes. The words "mean residence time" as used in the present invention is defined by the following equation.

Mean residence time (min) =

$$\frac{\text{Slurry volume in tank (l)}}{\text{Charging or discharging rate of slurry (l/min)}}$$

In case of employing some tanks, the mean residence time of not more than 60 minutes means the total residence time of each tank, i.e. in case of two tanks each mean residence time in the tanks being not more than 30 minutes, and in case of three tanks each mean residence time in the tanks being not more than 20 minutes.

The slurry to be treated is preferably introduced from a lower part of the tank in order to uniformly disperse the polymer without floating. More preferably the slurry is introduced from a position under the lowest turbine blades.

The discharge of the treated slurry is preferably carried out from an upper part of the tank in order to avoid the short-passing of a slurry having a high concentration of the high bp organic compound. Practically, overflow operation is preferably employed.

According to the present invention, high bp organic compounds contained in a floatable polymer can be efficiently removed down to not more than 10 ppm (in resin) without reducing various properties of the polymer such as processability and stability and further without coloring, smell and the like. Therefore, when the polymer is used as wrapping or package materials, not only the treated polymer is advantageous in smell, but also problems in health caused by the high bp organic compound such an unreacted monomer can be solved.

In addition, according to the process of the present invention since the short-pass of the highly concentrated high bp organic compound does not occur even if the process is carried out in the continuous operation, the high bp organic compound can be removed more readily and more effectively down to the desired low concentration.

The present invention is more particularly described and explained by means of the following Examples. It is to be understood that the present invention is not limited to the Examples and various changes and modifications may be made in the invention without departing from the spirit and scope thereof.

EXAMPLE 1 AND COMPARATIVE EXAMPLE 1

Batchwise operation was carried out by using a stripping apparatus (diameter:900 mm, height:2000 mm) as shown in FIG. 1. The stripping apparatus was equipped with paddle blades and flat turbine blades both of which had a blade diameter of 380 mm and a blade width of 80 mm. The apparatus was charged with 500 l of a thermally treated MBS polymer slurry having a polymer concentration of 16% and an unreacted styrene monomer concentration of 1200 ppm (in the dry resin). After elevating a slurry temperature to 80° C. by bubbling steam, the stripping treatment was carried out for 60 minutes by bubbling air at 1.5 Nm$^3$/min (3 VVM) and by agitating at an impeller Reynolds number of $1.3 \times 10^6$.

After the stripping treatment, the styrene monomer concentration remained in the polymer of the thermally treated slurry was 8 ppm.

As a result of smelling test, smell of styrene of the treated polymer was extremely improved in comparison with the untreated one.

Powder characteristics and processability of the treated polymer were measured according to the following methods. The results are shown in Table 1.

For comparison, powder characteristics and processability of the untreated polymer were also measured. The results are shown in Table 1.

[Distribution of Particle Size]

After the polymer particles were subjected to wet classification with Tyler standard sieves, the classified polymer particles were dried for 25 minutes with an infrared ray water content meter, and then a weight of each dried polymer was measured. From the data distribution of particle size was calculated.

[Bulk Gravity]

Measured according to JIS K 6721.

[Caking Property]

After compressing 30 g of the polymer powder in a cylindrical vessel of 5 cm in inner diameter by applying 25 kg load for 2 minutes at room temperature to prepare a hardened mass, the mass was vibrated for 200 seconds on a sieve which was vibrated at a frequency of 60 Hzs and at an amplitude of 1 mm.

Breakdown rate of the mass (%) was measured.

[Flowing Property]

To a hopper having a bore diameter of 5 mm, a height of 60 mm and a hopper angle of 45° which was filled with the polymer powder to the upper end of the hopper was applied an impact of a constant intensity. The number of impacts at a time when the powder in the hopper was completely flowed out was measured.

[Angle of Repose]

Measured by using a powder tester available from Hosokawa Micron Kabushiki Kaisha.

[Izod Strength]

Measured according to JIS K 7110.

[Transparency]

Measured according to ASTM D 1003-61.

[Color Tone]

Measured according to the measuring conditions defined in JIS Z 8722.

TABLE 1

| Example No. | Powder Characteristics | | | | | | | | |
|---|---|---|---|---|---|---|---|---|---|
| | Water content of dehydrated cake (% to dried resin) | Average particle size (μm) | Distribution of particle size (%) | | | | | | |
| | | | larger than 16 meshes | 16 to 32 meshes | 32 to 62 meshes | 60 to 100 meshes | 100 to 145 meshes | 145 to 280 meshes | smaller than 280 meshes |
| Example 1 | 46.2 | 150 | 0 | 5.2 | 17.6 | 40.7 | 18.0 | 12.0 | 6.5 |
| Comparative Example 1 (without stripping treatment) | 43.2 | 160 | 0 | 3 | 18.7 | 92.2 | 18.9 | 12.6 | 4.6 |

| Example No. | Powder Characteristics | | | | Processability | | | | | |
|---|---|---|---|---|---|---|---|---|---|---|
| | Bulk gravity (g/cc) | Caking property (%) | Flowing property (5 mmφ, times) | Angle of repose (degree) | Izod strength (kg/cm/cm, 23° C.) | Transparency | | Color tone | | |
| | | | | | | T₂ % | HAZE % | L | a | b |
| Example 1 | 0.395 | 87.2 | 2 | 32 | 15.7 | 82.5 | 5.0 | 72.3 | −1.2 | 9.1 |
| Comparative Example 1 (without stripping treatment) | 0.383 | 88.5 | 4 | 33 | 16.1 | 82.4 | 4.8 | 71.0 | −0.7 | 8.8 |

As is clear from Table 1, the powder characteristics and processability of the stripping-treated polymer powder are not different from those of the polymer powder which is not subjected to the stripping treatment.

EXAMPLE 2 AND COMPARATIVE EXAMPLE 2

A stripping apparatus (diameter:500 mm, height:1100 mm) with an aditator having paddle blades and flat turbine blades both of which had a blade diameter of 180 mm and a blade width of 50 mm was charged with 70 l of water. After elevating a temperature of water to 80° C. by introducing steam, the charged water was agitated at an impeller Reynolds number of $8 \times 10^5$ while bubbling air at 0.36 Nm³/min (4 VVM). Stripping treatment was carried out by charging the stripping apparatus with a slurry of a thermally treated MBS polymer (polymer concentration in slurry:13%, remaining unreacted styrene monomer content in the dry resin:80 ppm) so that a mean residence time was 45 minutes. After 3 hours from the beggining of the stripping treatment, the drained thermally treated slurry contained a remaining styrene monomer of 8.5 ppm.

As a result of the smelling test, smell of the stripping-treated polymer was remarkably improved in comparison with the untreated polymer.

Powder characteristics and processability of the obtained polymer were measured in the same manner as in Example 1. The results are shown in Table 2.

For comparison, the powder characteristics and processability of the untreated polymer were also measured. The results are shown in Table 2.

TABLE 2

| Example No. | Powder Charcteristics | | | | | | | | |
|---|---|---|---|---|---|---|---|---|---|
| | Water content of dehydrated cake (% to dried resin) | particle size (μm) | Distribution of particle size (%) | | | | | | |
| | | | larger than 16 meshes | 16 to 32 meshes | 32 to 62 meshes | 60 to 100 meshes | 100 to 145 meshes | 145 to 280 meshes | smaller than 280 meshes |
| Example 2 | 44.8 | 160 | 0 | 4.7 | 17.3 | 42.0 | 18.0 | 11.8 | 6.2 |
| Comparative Example 2 (without stripping treatment) | 43.5 | 165 | 0 | 3.2 | 17.9 | 43.1 | 18.9 | 12.2 | 4.7 |

| Example No. | Powder Characteristics | | | | Processability | | | | | |
|---|---|---|---|---|---|---|---|---|---|---|
| | Bulk gravity (g/cc) | Caking property (%) | Flowing property (5 mmφ, times) | Angle of repose (degree) | Izod strength (kg/cm/cm, 23° C.) | Transparency | | Color tone | | |
| | | | | | | T₂ % | HAZE % | L | a | b |
| Example 2 | 0.388 | 87.9 | 3 | 33 | 16.0 | 82.3 | 4.7 | 71.7 | −1.0 | 9.0 |
| Comparative Example 2 (without stripping treatment) | 0.385 | 88.6 | 4 | 33 | 16.1 | 82.6 | 4.8 | 71.4 | −0.8 | 8.9 |

As is clear from Table 1, the powder characteristics and processability of the stripping-treated polymer powder are not different from those of the polymer powder which is not subjected to the the stripping treatment.

What we claim is:

1. A process for removing an organic compound having a boiling point of not less than 100 C. from a floatable polymer containing the organic compound, which comprises contacing an aqueous slurry of the plymer with a non-condensable carrier gas at a temperature in the range of 60 C. to 90 C. by strongly agitating with an agitator at an impeller Reynolds number of not less than $10^5$ to attain a level of the organic compound which does not adversely affect the properties of the floatable polymer.

2. The process of claim 1, wherein the agitator is provided in one or more agitating tanks.

3. The process of claim 2, wherein the agitating tanks are connected in series.

4. The process of claim 2, wherein the agitating tank or tanks are continuously charged and discharged with the polymer slurry.

5. The process of claim 2, wherein the agitator in the tank has at least one set of paddle blades which is provided above at least one set of turbine blades.

6. The process of claim 5, wherein the set of paddle blades is provided so that when the non-condensable gas is not introduced to the tank the set of paddle blades is positioned above the surface of the slurry, and that when the non-condensable gas is introduced to the tank the set of paddle blades is positioned under the surface of the slurry.

7. The process of claim 6, wherein the agitating tank has one or more baffle plates and the upper top edges of the paddle blades of the set of paddle blades is positioned above the baffle plate.

8. The process of claim 1, wherein the polymer is present in the slurry at a concentration of 8 to 20% by weight.

9. The process of claim 4, wherein the agitating tank is charged or discharged with the polymer slurry at a rate represented by slurry volume in the tank (l)/ charging or discharging rate of slurry (l/min) of 10 to 60 minutes.

10. The process of claim 5, wherein the one or more agitating tanks are continuously charged with the polymer slurry from a position below the lowest of the one or more sets of turbine blades, and are continuously discharged with the slurry by means of an overflow method.

11. The process of claim 1, wherein the non-condensable carrier gas is an inert gas which is gaseous at normal temperature.

12. The process of claim 1, wherein the non-condensable carrier gas is used in an amount of 1 to 4 VVM.

* * * * *